United States Patent [19]

Montagne

[11] 3,907,019

[45] Sept. 23, 1975

[54] TIRE TREADS MADE OF AN ORIENTED ELASTOMER MIXTURE

[75] Inventor: Jean Bernard Montagne, Cebazat, France

[73] Assignee: Compagnie Generale des Etablissements Michelin, Clermont-Ferrand, France

[22] Filed: May 2, 1974

[21] Appl. No.: 466,123

Related U.S. Application Data

[63] Continuation of Ser. No. 182,616, Sept. 22, 1971, abandoned.

[52] U.S. Cl............ 152/330 R; 156/123; 156/130; 156/162; 152/209; 152/354
[51] Int. Cl.$^2$.................. B29H 17/37; B60C 11/00
[58] Field of Search ........... 156/130, 117, 112, 397, 156/162; 152/209, 330, 354

[56] References Cited
UNITED STATES PATENTS

| | | |
|---|---|---|
| 1,312,491 | 8/1919 | McClenathen.................. 156/112 |
| 1,500,786 | 7/1924 | Allen............................... 156/112 X |
| 2,009,599 | 7/1935 | Woock............................ 156/130 X |
| 2,268,334 | 12/1941 | Hirsch et al. ................... 156/130 |
| 2,400,973 | 5/1946 | Bennett et al. .................. 156/112 |
| 2,411,659 | 11/1946 | Manning.......................... 156/117 |
| 3,223,573 | 12/1965 | Deist.............................. 156/130 X |
| 3,433,689 | 3/1969 | Maizoechi et al. ............. 156/130 X |
| 3,580,781 | 5/1971 | Hollis et al...................... 156/397 |
| 3,607,497 | 9/1971 | Chrobak.......................... 156/117 |
| 3,728,181 | 4/1973 | Simmons, Jr. .................. 156/130 |

*Primary Examiner*—Clifton B. Cosby
*Attorney, Agent, or Firm*—Brumbaugh, Graves, Donohue & Raymond

[57] ABSTRACT

An elastomer mixture is stretched to produce molecular orientation and wound onto a tire carcass in a series of turns to produce a tire tread. The tire is then vulcanized. The orientation, which survives the vulcanization, improves tread life and provides other benefits.

7 Claims, 3 Drawing Figures

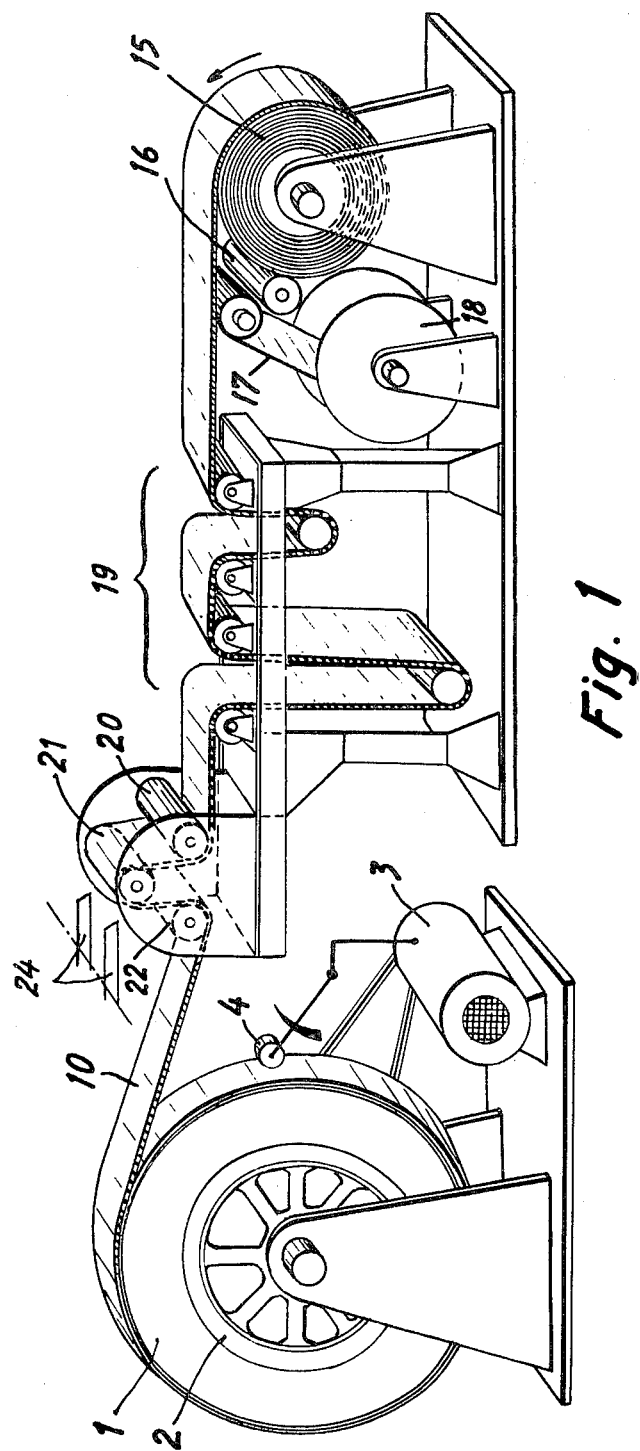

INVENTOR.
JEAN BERNARD MONTAGNE

TIRE TREADS MADE OF AN ORIENTED ELASTOMER MIXTURE

This is a continuation of application Ser. No. 182,616, filed Sept. 22, 1971, now abandoned.

BACKGROUND OF THE INVENTION

This invention relates to pneumatic tires and, more particularly, to novel and highly-effective pneumatic tires having treads made of an oriented elastomer mixture and a method of making such tires.

A tire is conventionally made by means including various preformed elements in the shape of sheets or profiled parts of suitable cross-sections. The manufacture consists of winding and superimposing these various elements on each other. The tire thus made is then vulcanized to fix and weld together the various elements of elastomer-base mixtures and obtain the final product.

Although the various treatments given the filled elastomers (calendering, extrusion) may, in the same way as the manufacturing operations themselves, have to some extent a directional effect, the various elastomer portions exhibit, in the finished, vulcanized tire, only a slight anisotropism of the properties. This anisotropism is unintended and in practice negligible and can in fact be detected only by very delicate tests; it is difficult to distinguish in the mass of a vulcanized mixture a direction in which the material shows properties which are significantly different from those which it shows in other directions. This is because the vulcanization, which is generally effected at elevated temperature, causes a relaxation of the internal stresses which might possibly remain in the elements which served for the making of the tire and which come either from the preparation or the putting in place of these elements. The quasi-isotropism of the properties of vulcanized rubber is, moreover, considered by those skilled in the art to be a favorable characteristic, since the presence of large internal stresses which survive vulcanization might produce irregularities in weight (imbalance) or shape of the tire.

It is within this context that the applicant has discovered that, contrary to what has been believed heretofore, it is on the one hand possible under certain conditions and on the other hand advantageous in certain respects to maintain a marked anisotropism of the rubber, despite a vulcanization carried out under normal conditions. Both of these facts are surprising and are contrary to the knowledge and experience acquired by the rubber engineers.

SUMMARY OF THE INVENTION

An important object of the present invention is to provide a pneumatic tire the tread of which has superior wear properties. The foregoing and other objects are attained in accordance with the invention by the provision of a pneumatic tire, whether new or recapped, whose tread comprises a vulcanized elastomer mixture characterized in that the elastomer is oriented in a direction which in the tire footprint area (area of contact of the tire with the surface along which the tire travels) is parallel to the surface of travel and preferably parallel to the direction of travel.

In accordance with a preferred characteristic, the tread has a laminated structure, the layers forming the laminated structure extending circumferentially of the tire.

In accordance with an additional feature, the thickness of the superimposed layers of the laminated structure constituting the tread is, in the vulcanized tire, between 0.1 mm and 5.0 mm.

An elastomer mixture that is "oriented" in a particular direction as such expression is used in the present specification and in the appended claims designates a mixture having a base of elastomer a substantial portion of the molecular chains and/or agglomerates of reinforcing fillers of which is arranged parallel to such direction. Accordingly the mixture in question possesses in such direction properties different from those which it possesses in the other directions, and in particular in perpendicular directions. Such a mixture has in particular a greater crystallization rate at low temperature which is higher than that of a nonoriented mixture, in the event that the base elastomer is crystallizable. Likewise, the X-ray diffraction spectrum of a sample of a mixture having a base of oriented elastomers shows a higher degree of crystallization or orientation when stretched in the preferred direction than when stretched in perpendicular directions.

A structure that is "laminated" designates a structure which is formed by the superpositioning of parallel layers (of elastomer mixture) adhering to one another and which has undergone vulcanization in this condition. The laminated structure is clearly evident after vulcanization when a cut is made perpendicular to the component layers: at each interface the cut assumes a duller or brighter appearance than in the spaces between interfaces, even if all the layers are of the same mixture, in the same manner as when several layers of different mixtures are caused to adhere to each other.

The method of the invention for obtaining a tire whose tread comprises a mixture having a base of elastomer oriented along the direction of travel is characterized in that the tread is applied to the carcass after the tread elastomer has been subjected to a stretch in the direction of winding which causes an elongation of the tread elastomer by 75% to 600%, and preferably 100% to 300%, the tire being then subjected to the vulcanization and the tread retaining at least a part of the elongation imposed upon it.

The method of the invention for obtaining a tread of laminated mixture with a base of oriented elastomer is characterized in that the tread is formed by winding a sheet formed of a mixture of vulcanizable elastomer base, which sheet has experienced a stretch of 75% to 600%, and preferably 100% to 300%, in the direction of winding, the tire being subjected to vulcanization after winding the number of turns necessary to obtain the thickness desired.

In one embodiment, the profiled member or sheet forming the tread is stretched at the very moment when it is placed on the carcass, the stretch being retained following the placing thereof.

In another embodiment, the profiled member or sheet forming the tread is subjected to a greater stretch than the final stretch desired, the stretch possibly exceeding the elastic limit, and is placed on the carcass when, after partial contraction, the tread is at the final percentage of elongation desired.

The processes in accordance with the invention are advantageously employed in the event that the tread is placed either onto a previously shaped new carcass, that is to say, a carcass which has been placed into ring shape, or onto the carcass of a tire which is to be recapped. They can also be used in the event that the tread is placed on a nonshaped carcass, that is to say, a cylindrical carcass.

As indicated previously, the treads obtained by the processes of the invention exhibit a structural anisotropism which results in an anisotropism of the properties inherent in the intimate structure. Numerous macroscopic properties such as modulus of elasticity, rupture strength and elongation at rupture, and electrical resistivity are affected more or less significantly, and differences not exceeding 30% can be observed, depending upon the direction of measurement. Moreover, what is modified in a very definite and significant manner is, on the one hand, the relative position of the macromolecular chains and/or of the agglomerates of carbon black and other fillers and, on the other hand, the hysteresis loss which is no longer the same for all directions, and finally the performance in use and other technological properties of the treads in question.

With respect to the orientation of the macromolecules or fillers, the stretching of the mixture in the unvulcanized state produces an effect which is retained, despite the subsequent vulcanization. It has, as a matter of fact, been noted that at low temperature (−25°C.), pieces of vulcanized mixtures taken from the tread of a tire in accordance with the invention crystallize definitely faster than pieces taken from a tread manufactured with the same mixture which, however, has not undergone the stretching treatment before application. This is because the stretching effected before vulcanization orients at least certain portions of the rubber and the vulcanization does not entirely destroy this effect. In certain cases this oriented texture can be shown also by examination under an electron microscope of mixtures obtained in accordance with the invention.

The same interpretation must be given to the fact that, after vulcanization, a sample of tread shows greater tendency to crystallize when it is stretched in the direction of the tension imposed prior to vulcanization than when it is stretched in perpendicular directions.

Aside from the effects exerted on the elastomer proper, it appears that the strong tension which it undergoes in a preferred direction results in an orientation of the particles of other ingredients of the mixture and in particular of the carbon black. Moreover, the orientation of the molecules forming the elastomer mixture makes it easier for them to come close together, which can improve the bonding forces and therefore the internal coherence of the vulcanized product.

The advantage in orienting the elastomer of a filled mixture is not merely theoretical: the work of the applicant has clearly shown that this orientation results in technical advantages.

First, measurements with a Goodrich flexometer have shown that a tread in accordance with the invention has a significantly smaller hysteresis loss in the case of imposed deformations oriented in the direction of the extension to which the tread has been subjected than in the case of imposed deformations oriented in perpendicular directions. Ordinary treads do not exhibit this feature, nor this improvement in properties.

Second, wear properties are substantially improved. Thus, in a sufficiently large number of tests to eliminate chance phenomena, it has been found on tires for scrapers, under identical conditions of use, that the time of travel required for the loss of 5% of the tread weight increased from 70 hours of travel, on the average, in the case of controls to 120 hours, on the average, in the case of tires in accordance with the invention. In similar manner, truck tire treads suffered a loss in weight of 5% in 225 hours of travel in the case of the invention, instead of 150 hours in the case of controls. Such an increase in tread life (of the order of 50% to 100%) is of great economic importance. To this it can be added that the tread life is improved not only quantitatively but also qualitatively, the loss of weight being more uniform in the case of the invention.

BRIEF DESCRIPTION OF THE DRAWING

An understanding of other aspects of the invention can be gained from the following detailed description of the preferred embodiments thereof, in conjunction with the appended figures of the drawing, wherein:

FIG. 1 is a schematic perspective view of a tread winding installation in accordance with the invention;

DESCRIPTION OF THE PREFERRED EMBODIMENTS

Figure 3:
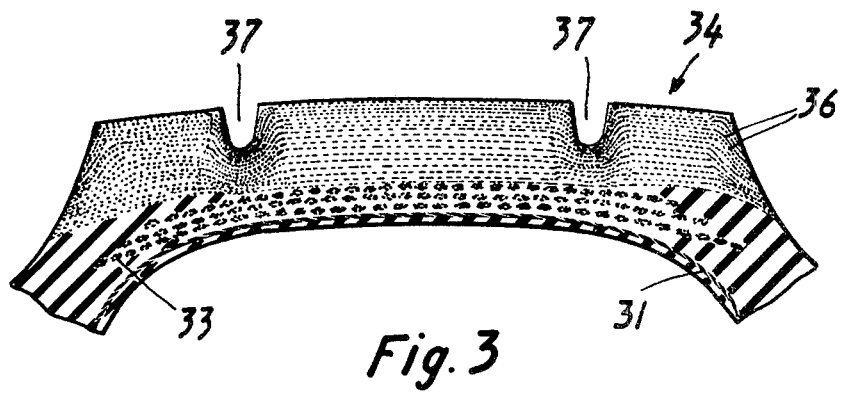
FIG. 3 is a view in radial section, on a larger scale than in FIG. 2, of the pneumatic tire after vulcanization, this view being limited to the tread which has been placed in final form.

FIG. 1 shows a pneumatic tire carcass 1 during the placing on of the tread. The carcass 1, which may be a new carcass or a reclaimed carcass which is to be recapped, is mounted on a rim 2 and is inflated by means of an inner tube or in any other suitable way to a pressure of about 1 kg/cm$^2$. The assembly is driven in rotation by an electric motor 3 the speed of which is regulated by means of a senser 4 so as to maintain the circumferential speed $V_1$ of the carcass constant. This means that the angular speed at which the tire 1 is rotated is gradually reduced as the winding progresses.

The tread is formed progressively by the winding of a sheet of rubber 10 having, in a representative embodiment, the following composition (parts by weight):

| | |
|---|---|
| Smoked sheet No. 1 | 100 |
| Stearic acid | 2 |
| Carbon black type HAF | 50 |
| Zinc oxide | 5 |
| N-cyclohexylbenzothiazyl sulfenamide | 1 |
| Phenyl-beta-naphthylamine | 1 |
| Working oil | 5 |
| Sulfur | 2 |

This rubber sheet is supplied in the form of rolls, such as the roll 15, obtained from a calender. At this stage it has a thickness of 2 mm. The roll 15 is driven in rotation in the direction indicated by the arrow by a drive roller 16. An interposed sheet 17 of fabric or polyethylene or other suitable material separates the successive turns of sheet 10. Upon the unwinding of the roll, the interposed sheet 17 is taken by a roll 18 which is driven by a motor.

From the roll 15, the sheet 10 is directed onto a compensator 19 which stores under slight tension a variable length of sheet, permitting the roll 15 to continue to unwind in the interval between two layers of tread.

Between the compensator 19 and the carcass 1, the sheet 10 passes over the drive rolls 20, 21 and 22 which drive the sheet at a constant linear speed $V_0$ which is substantially less than the speed $V_1$. Between these rolls and the carcass, the sheet 10 therefore experiences an imposed elongation, its length increasing in the ratio $V_1/V_0$.

At the roll 21 there are conventionally operated knives 24 illustrated schematically intended to cut out in accordance with a predetermined program a central portion or for example two lateral portions of the sheet 10 in accordance with the profile which it is desired to obtain for the tread.

By way of examples of stretchings effected, there are given below for the mixture mentioned the initial and final dimensions of the sheet 10:

| | |
|---|---|
| Initial thickness | 2 mm |
| Final thickness | 1.1 mm approximately |
| Initial width | 650 mm |
| Final width | 430 mm |
| Stretch ratio | 2.7 (i.e. 170% elongation) |
| Speed of winding onto carcass 1 | 18 m/min. |

When a carcass 1 has been imparted by winding a number of turns corresponding to the quantity necessary to form a tread, the speed of the motor 3 is increased for a short time in order to produce an additional permanent elongation of the sheet 10 between the carcass 1 and the roll 22. The sheet 10 can then be cut, the tire 1 removed and another tire placed on for another operation. The tension of the sheet 10 favors the adherence of each turn to the preceding one, as well as the elimination of air between the sheet 10 and the carcass 1 being wound up.

The tire 1 which has received its tread is then vulcanized. One can proceed either in a manner conventional for a new tire, that is to say place the tire in a mold which gives it its final shape, and vulcanize it, or proceed in the manner conventional for a recapped tire, that is to say, place the tire in an oven to vulcanize it with live steam, the sculpturing being formed after vulcanization by means of gouges.

Figure 2:
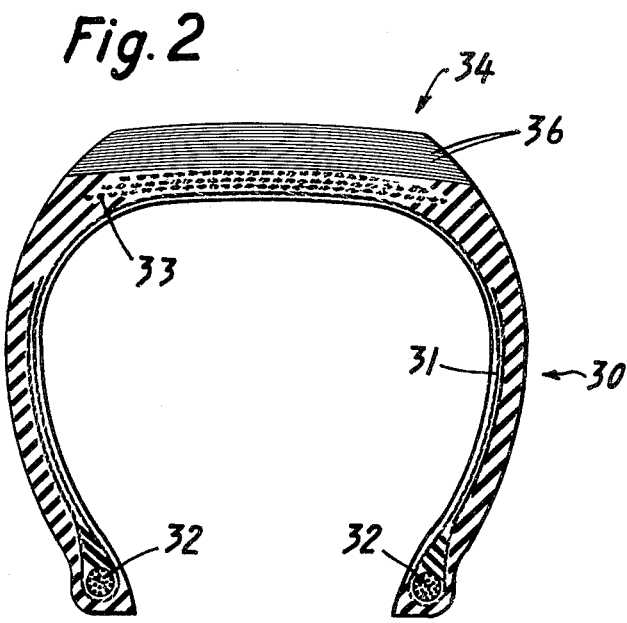
FIG. 2 is a view in radial section of a pneumatic tire according to the invention prior to vulcanization.

FIG. 2 shows a tire according to the invention before vulcanization.

The conventional parts of a tire can be noted, namely, the carcass 30 comprising a reinforcement 31 wound around steel bead wires 32, the top reinforcement 33 and the tread 34. As can be seen, the tread is formed by the superimposing of a large number of layers 36 which are all parallel and of the same thickness.

FIG. 3 shows the top of the same tire after vulcanization; the impressing of the grooves 37 somewhat modifies the contour and thickness of the layers 36, primarily in the vicinity of the zones which have undergone hot flow. The laminated appearance of the tread 34 is clearly evident. In the case of a tire which is sculptured after vulcanization, the laminated appearance of the tread would retain the parallelism of the layers 36 as shown in FIG. 2.

Thus there is provided in accordance with the invention a novel and highly-effective tire whose tread has a greatly extended useful life and many other desirable properties. The invention is not limited to the example described. One can, without going beyond its scope, make many changes, including, for instance, the winding of several sheets with different tensions and elongations, variation of the tension during winding in accordance with any given law, the application in addition to a tension in the longitudinal direction of a tension in the transverse direction, and the adoption of tensions and elongations which are either greater or less than in the example described. Other embodiments in which the tread is subjected before or during application to high stretch and elongation and is vulcanized in the condition of high stretch and elongation after application will readily occur to those skilled in the art. Accordingly, the invention is to be construed as including all the embodiments thereof within the scope of the appended claims.

I claim:

1. A pneumatic tire comprising a carcass, a carcass reinforcement reinforcing said carcass, bead wires anchoring opposite ends of said carcass reinforcement, a tread, and a tread reinforcement reinforcing said tread, said tread having a surface that makes contact with the ground in a tire footprint area during rolling of the tire, said tread being formed of a vulcanized elastomer mixture, the elastomer of said elastomer mixture having been stretched in the unvulcanized state beyond its elastic limit in thin sheets and being oriented in a direction which is parallel to said surface of said tread and having a modulus of elasticity, rupture strength, elongation at rupture, electrical resistivity, and hysteresis which are different in different directions.

2. A pneumatic tire according to claim 1 wherein said elastomer is oriented in a direction extending circumferentially of said tread.

3. A pneumatic tire according to claim 1 wherein said elastomer mixture comprises a plurality of laminated layers extending circumferentially of said tire.

4. A pneumatic tire according to claim 1 wherein said elastomer mixture comprises a plurality of laminated layers extending circumferentially of said tire and wherein the thickness of said layers is within the range of 0.1 mm to 5.0 mm.

5. A method of manufacturing pneumatic tires comprising the steps of providing a carcass, providing a carcass reinforcement for said carcass, providing bead wires anchoring opposite ends of said carcass reinforcement, providing an elastomer mixture for application to said carcass to form a tread, stretching said elastomer mixture beyond the elastic limit thereof to effect a greater elongation of said elastomer mixture than the final elongation thereof desired, permitting partial contraction of said elastomer mixture.

6. A method according to claim 5 comprising the steps of winding said elastomer mixture onto said carcass circumferentially of said carcass in a plurality of turns and effecting said stretching in the direction of said winding.

7. A method according to claim 5 comprising the step of effecting said stretching at the moment of application of said elastomer mixture to said carcass.

* * * * *

UNITED STATES PATENT AND TRADEMARK OFFICE
CERTIFICATE OF CORRECTION

PATENT NO. : 3,907,019
DATED : Sept. 23, 1975
INVENTOR(S) : Jean Bernard Montagne It is certified that error appears in the above-identified patent and that said Letters Patent are hereby corrected as shown below:

<u>Col. 6, last line of claim 5</u>, change the period to a comma and insert --applying said elastomer mixture when so stretched to said carcass to form a tread, and vulcanizing said tire, said elastomer mixture retaining after vulcanization at least a portion of said elongation.--

Signed and Sealed this twenty-seventh Day of January 1976

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,907,019
DATED : September 23, 1975
INVENTOR(S) : JEAN BERNARD MONTAGNE It is certified that error appears in the above-identified patent and that said Letters Patent are hereby corrected as shown below:

First Page, Item "[30] Foreign Application Priority Data
September 30, 1970    France..............70.35449"
should be inserted.

Signed and Sealed this

Third Day of August 1976

[SEAL]

Attest:

RUTH C. MASON
*Attesting Officer*

C. MARSHALL DANN
*Commissioner of Patents and Trademarks*